March 20, 1962  R. E. CROSS ETAL  3,025,728
TOOL DETECTOR
Filed Dec. 17, 1958  7 Sheets-Sheet 7

INVENTORS.
Ralph E. Cross.
Herbert H. Martens
BY
Barnes, Dickey & Pierce.
ATTORNEYS.

United States Patent Office 3,025,728
Patented Mar. 20, 1962

3,025,728
TOOL DETECTOR
Ralph E. Cross, Grosse Pointe Shores, and Herbert A. Martens, Birmingham, Mich., assignors to The Cross Company, Fraser, Mich., a corporation of Michigan
Filed Dec. 17, 1958, Ser. No. 781,089
19 Claims. (Cl. 77—22)

This invention relates to tool detectors and more particularly to equipment for association with a machine tool for producing an indication when a cutting tool forming a part of that machine is of improper length or is broken.

The principles of the invention are most advantageously applied to automatic machine tools in which cutting operations are repetitively performed on a series of workpieces in an automatic manner and without close and constant supervision by an operator. It has been found, in such machines, that tool breakage is a major contributor to machine down-time. Equipment such as that disclosed in United States Patent 2,679,038, granted May 18, 1954, to R. E. Cross et al. can be utilized to reduce this down-time by reducing the incidence of tool breakage, that equipment serving to shut down the machine whenever any one of the cutting tools thereof has performed a number of operations indicative that tool damage or breakage is likely to occur if the cutting tool is not then replaced. While that equipment, in practice, has measurably reduced the extent of the tool breakage and the extent of down-time, some tool breakage may still occur due, for example, to unusual work loads being imposed upon the tool (as by hard spots in the workpieces) or to defective tools. Further, while the provision of means for presetting the tools to length referenced in the noted patent tends to insure that the tools will be set to proper length, it is not impossible for an operator to improperly set the tools, and particularly it is not impossible for the operator to set the tools too short. The equipment disclosed in the noted patent will not produce a signal or shut down the machine if the cutting tool is of improper length due to improper setting or due to breakage.

Improperly set or broken tools will normally produce defective workpieces and, in the absence of appropriate detecting means, a series of defective workpieces may be produced before the condition is discovered in an automatic operation. Accordingly, an object of the present invention is to provide means for producing a signal or output indication or to shut down the machine tool if any one of the cutting tools forming a part thereof is of improper length or broken.

The principles of the invention have been representatively disclosed in conjunction with a machine tool for drilling one or more holes in a workpiece. The machine tool includes a base and a head supported upon and movable with respect to the base. The head includes one or more cutting tools which are carried by the head from a position spaced from the workpiece to a position in which the cutting tools are in cutting engagement with the workpiece. A sensing means for each cutting tool is disposed in the path of travel of that cutting tool so as to be disposed in sensing relationship with portions of the cutting tool during all or a part of the travel of the cutting tool between the noted positions. In the preferred arrangement, this sensing means comprises an inductor in the form of a coil of wire positioned between the head and the workpiece and positioned so that each drill, in advancing toward the workpiece will enter and pass through the sensing coil. While the sensing coil may be supported in any suitable fashion, in the illustrated arrangement it is mounted upon a bushing plate which is positioned proximate the workpiece and which further serves the function of guiding the drills. In some machine tools, such bushing plates are fixed in a position adjacent the transfer device or conveyor system which advances the workpieces successively into position for drilling. In other machines, the bushing plate is movable toward and away from the workpiece for various reasons such as for establishing clearances preliminary to indexing the workpiece, and the subject sensing means can be associated with either of those types of bushing plates.

The inductance coil is disclosed as forming a part of an oscillatory circuit in a control means which serves, in effect, to produce one indication if no cutting tool is contained within the sensing coil and a different indication if the metallic cutting tool is disposed within the sensing coil. In the preferred embodiment in which the sensing means is disposed in sensing relationship with the cutting tool only during a part of the travel of the cutting tool, the control means (including the sensing means) is energized only at selected times in the operation of the machine tool. In another embodiment in which the sensing means is continuously in sensing relationship with the cutting tool, the control means is or may be continuously energized or enabled. The control means senses the presence or absence of a cutting tool within the coil to detect when a trouble condition has risen.

The embodiment in which the sensing means is continuously in sensing relation with a proper-length unbroken tool possesses the primary merit of simplification of the control circuitry, but the arrangement in which the sensing occurs only during a portion of the travel of the tool is presently preferred due to its adaptability to different requirments and to various machine tools. The preferred arrangement's flexibility of adaptation to diverse requirements and conditions permits a greater degree of standardization of equipment, facilitates cutting tool replacement, and permits the association of sensing equipment with a much larger variety of machine tools, such as those in which the length of travel of the cutting tool is greater than the exposed length of the cutting tool.

In the disclosed arrangements in which the control means is energized at selected times during the operation of the machine tool, two types of means are disclosed for insuring that the sensing of tool length will occur only at the appropriate times. In one form, one or more limit switches are each supported on the machine tool base in a position to be tripped by an actuator mounted upon the head. In another form, one or more inductance coils are each mounted upon the base in a position to accept a metallic rod secured to the head. The position of the rod, the length of the rod, and the position of the inductance coil are so selected that the end of the rod will depart from sensing relationship with its associated inductance coil at the same time that a cutting tool of proper length is entering its associated sensing coil. Both inductances are included in the oscillatory circuit and an output trouble indication is produced at any time that neither of the two inductance coils is in sensing relation with the associated metallic elements.

Means are also disclosed for controlling a single output device in accordance with the condition of each of a plurality of cutting tools upon a single machine tool.

A more detailed understanding of the principles of the invention may be obtained from the following detailed description of embodiments of the invention when read with reference to the accompanying drawings in which:

FIG. 6 is a schematic representation of an electrical control equipment including the sensing means and the position-detecting means of FIGS. 1 through 5;

Figure 1:
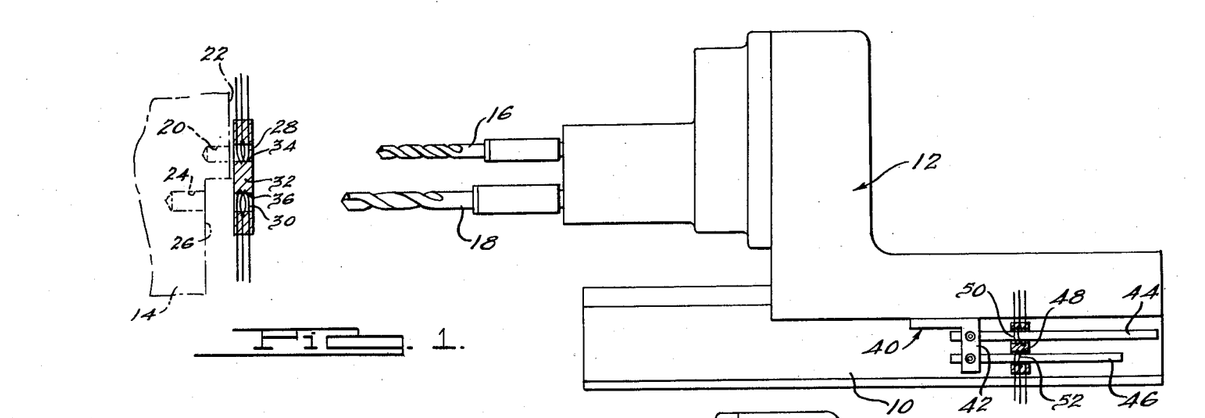
FIGURE 1 is a side elevational view of a machine tool in association with a cutting tool sensing means and means for detecting a critical position of the machine tool head with respect to the base, the head being shown in a fully retracted position.

Those elements of a representative machine tool which are significant to the practice of the principles of the present invention are illustrated in FIG. 1 of the drawings. The machine tool there shown comprises a base 10 slidably supporting a head 12 for movement in translation toward and away from a workpiece 14. The head 12 carries a plurality of cutting tools representatively illustrated as drills 16 and 18 which, in the normal manner, are mounted in individual spindles for individual rotation relative to the workpiece 14. In the illustrated arrangement, drill 16 is adapted to drill a hole 20 in a face 22 of the workpiece 14 while drill 18 is adapted to drill a larger diameter hole 24 in an offset face 26 of the workpiece 14. The nature of these cutting tools and their relationship to the workpiece are, of course, purely representative.

An inductance coil 28, preferably annular in configuration and having a central aperture larger in diameter than drill 16, is mounted adjacent workpiece 14 coaxially with the drill 16, and an inductance coil 30 is similarly associated with drill 18. Inductance coils 28 and 30 are supported by a member 32 which is normally fixed in position relative to the workpiece 14 and relative to the base 10. Member 32 is provided with apertures 34 and 36 adapted to accept drills 16 and 18 respectively. Member 32 may be made of insulating material with the inductance coils 28 and 30 being imbedded in the walls of the apertures 34 and 36 or those inductance coils may be wound about individual bobbins which are mounted as inserts in the member 32. It is preferred that no ferrous element be interposed the coils and the drills when the drills are within the apertures 34 and 36.

In many machine tools of this nature, a bushing plate is mounted proximate the workpiece which serves to guide and support the drills. It is contemplated that the inductance coils 28 and 30 be mounted upon bobbins which serve as the bushing elements of such a bushing plate. In certain such equipment, the bushing plate is moved relative to the workpiece preliminary to or as an incident of the drilling operation, particularly in circumstances where the surface of the workpiece which is to be drilled is recessed relative to other surfaces of the workpiece. In those cases, in order to position the bushing plate close to the surface to be drilled while yet insuring that the bushing plate does not interfere with movement of the workpiece to and from the work station, it is necessary to move the bushing plate towards the workpiece preliminary to or during the drilling operation. The features of the present invention can be applied to such an arrangement, the only requirement (in this embodiment) being that the tips of the drills be moved into proper sensing relationship with the sensing coils at some point during their travel into engagement with the workpiece and that the positional relationship between the bushing plate and the base be consistent from operation to operation at the instants that the tips of the cutting tools enter the bushing plate.

Figure 2:
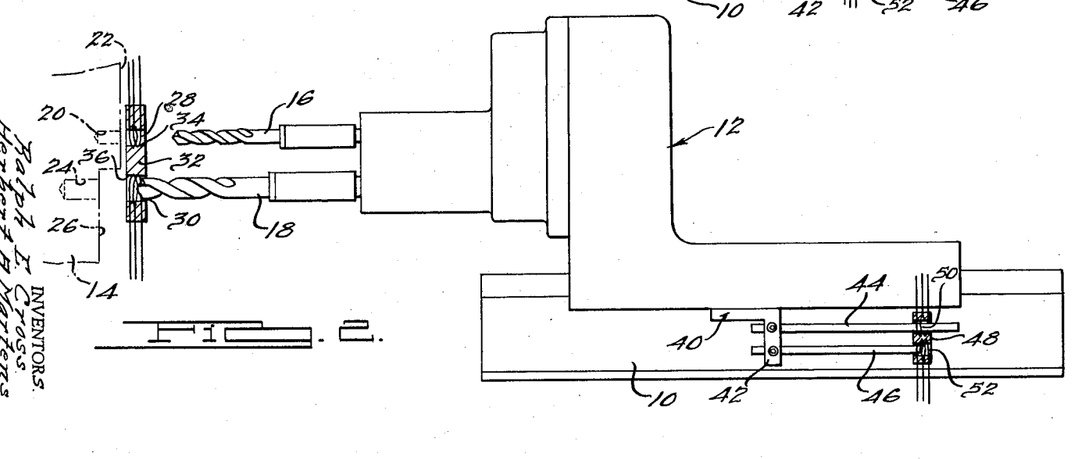
FIG. 2 is a view of the structure of FIG. 1 in an intermediate position of advance of the head with respect to the base.
Figure 3:
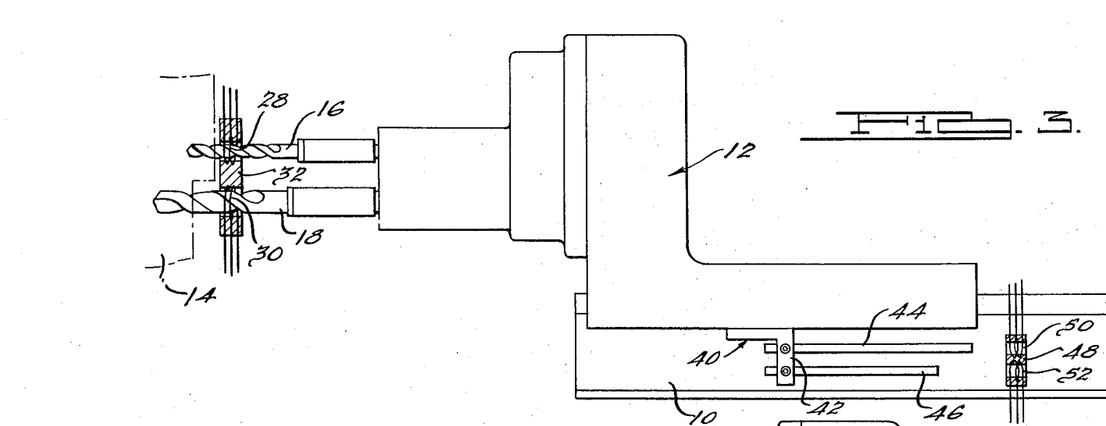
FIG. 3 is a view of the machine of FIG. 1 with the head in an advanced position.

In the view of FIG. 1, the head 12 is withdrawn so that the drills 16 and 18 are spaced from the workpiece 14 and from the member 32. After the workpiece is in position, the head 12 is advanced toward the workpiece. During the course of this movement, the longer of the two illustrated drills 18 will enter the aperture 36 and come into sensing relationship with the inductance coil 30. This condition in the advance of the head toward the workpiece is illustrated in FIG. 2 of the drawings. As the head continues to advance, the point will be reached at which the drill 16 enters the aperture 34 and comes into sensing relationship with the inductance coil 28. As the head advances further, the drills are brought into cutting engagement with the workpiece 14 and form the holes 20 and 24, the position of the equipment at the end of this drilling operation being indicated in FIG. 3 of the drawings.

The inductance coils 28 and 30 are, in the illustrated arrangement, air core inductors. Since the cutting tools 16 and 18 have an iron content, they will serve as elements of the flux-return paths as they enter the inductance coils so as to modify the reluctance of the flux-return paths and the effective inductance of those coils. As a result, the effective inductance of the coils 28 and 30 will be different when no tool is in sensing relationship therewith than it is when the iron-containing tools are disposed therewithin. This change in inductance is sensed by equipment to be described to provide an indication as to whether, at any selected time, a cutting tool is or is not disposed in sensing relationship with the inductance coils.

As noted, the tip of each of the cutting tools enters the associated aperture in the member 32 and comes into sensing relationship with the individual coil 28 or 30 at one point in the travel of the tool toward the workpiece. It is at this region that the sensing operation is preferably performed, for if the tool has advanced further toward the workpiece, an indication that a portion of the cutting tool is in sensing relation with the sensing coil would not necessarily preclude the possibility that the extreme tip of the tool was broken or was of improper length. Consequently, the equipment is arranged so that if it is to be determined whether the cutting tool is set short or broken, the sensing operation occurs at the instant that the tip of a correct length, unbroken cutting tool reaches sensing relationship with the sensing coil. Drill 18 is shown in this position in FIG. 2 of the drawings. This condition exists, with a proper length, unbroken cutting tool, at a fixed position of the head 12 in its movement toward the workpiece, which may be the fully retracted position. Therefore, the sensing operation can be initiated under the control of the position of the head 12 relative to the base 10, the arrival of the head 12 in the preselected positional relationship with respect to the base 10 being detected by means associated with both the head and the base. This means, in the embodiment of FIGS. 1 through 5 comprises one or more inductance coils associated with one or more rods, whereas this means, in the embodiment of FIGS. 7 through 11, takes the form of one or more limit switches and cooperating actuators.

In the embodiment of FIG. 1, a bracket 40 having a depending arm 42 is secured to the head 12 so as to move therewith and carries rods 44 and 46 whose axes are horizontal and parallel with the line of motion of the head. A member 48, secured to the base 10, is provided with apertures accepting rods 46 and 44 and supports the inductance coils 50 and 52 adjacent those apertures.

Rod 46 is individual to tool 18 and rod 44 is individual to cutting tool 16. Rod 46 is positioned so that its tip leaves its associated coil 52 at the instant that the tip of the drill 18 enters coil 30, this condition being illustrated in FIG. 2 of the drawings. Correspondingly, rod 44 is chosen in length and position so that its tip leaves the associated inductance coil 50 at the instant and position that the tip of drill 16 enters sensing coil 28. This condition will exist at a point in the travel of the head 12 between the FIG. 2 and FIG. 3 positions.

As will be seen hereinafter, control means is provided for sensing the conjoint inductance of inductance coils 28 and 50, and control means is provided for sensing the conjoint inductance of inductance coils 52 and 30. The control means is adjusted so that an indication of a defective condition will not be produced unless at some instant during the travel of the head neither of the inductance coils 50 and 28 or neither of the inductance coils 52 and 30 has a ferrous element therewithin. In the FIG. 1 position of head 12, both coils 50 and 52 have the metallic rods 44 and 46 (which has an iron content) therewithin so that no trouble condition will be indicated even though neither drill 16 nor 18 is disposed within its associated coil 28 or 30. Similarly, when the head 12 is advanced to the FIG. 3 position, no trouble indication will be transmitted because drills 16 and 18 are disposed within coils 28 and 30, respectively, even though rods 44 and 46 have been withdrawn from their respective coils 50 and 52. At the position illustrated in FIG. 2 of the drawings, the effective inductance of coil 52 is changing inasmuch as rod 46 is being withdrawn therefrom. However, the effective inductance of coil 30 is at the same instant changing in the opposite direction due to the fact that the unbroken drill 18 is entering coil 30. Consequently, there is no effective change of the conjoint inductance of coils 30—52. Similarly, as head 12 advances further to the left from the FIG. 2 position, no trouble indication will be produced at the instant that the tip of rod 44 leaves coil 50 for the reason that the tip of drill 16 is at that same instant entering coil 28.

Figure 4:
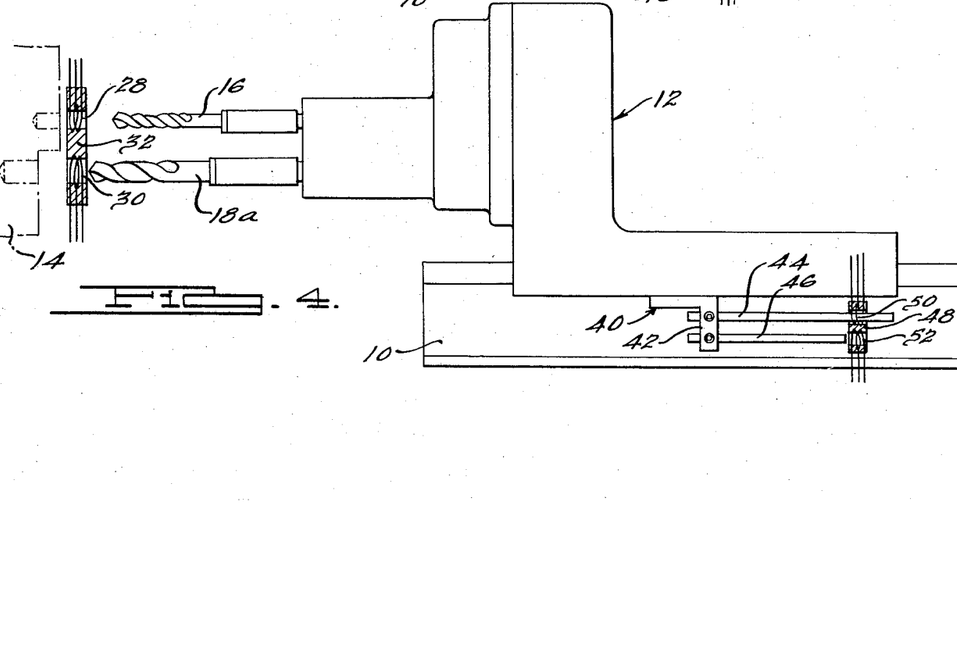
FIG. 4 is a view of the machine of FIG. 1 at a critical position of the advance of the head with respect to the base and in which one of the cutting tools has been set too short.
Figures 4, 5:
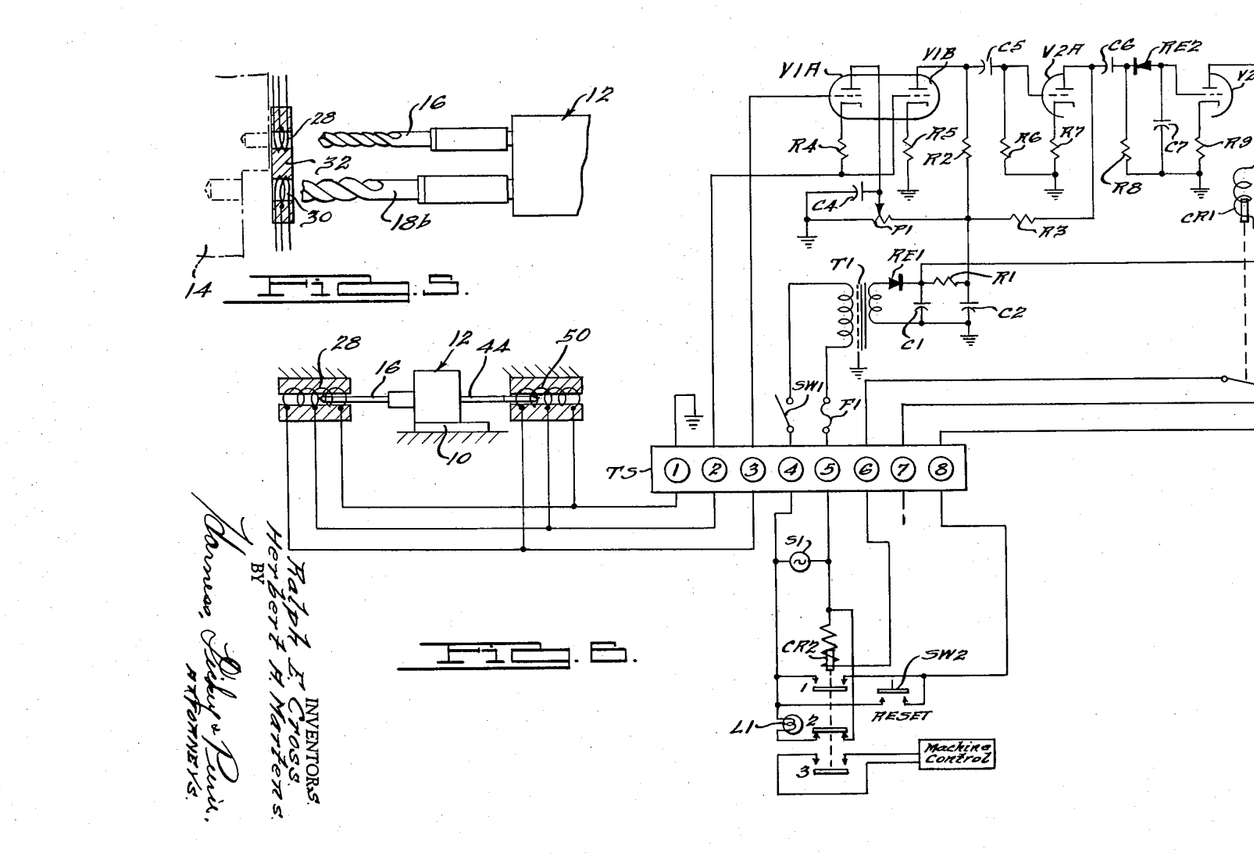
FIG. 5 is a fragmentary view of the machine of FIG. 1 in the positional relationship of FIG. 4 and in which one of the cutting tools is broken.

If one of the drills 16 or 18 is subsequently replaced, (due for example to its becoming dull) with a drill which is set too short, a trouble indication should properly be produced. This condition is represented in FIG. 4 of the drawings, in which it is assumed that drill 18 has been replaced with a drill 18a which is shorter than drill 18. Since drill 18a is too short, at the instant that the tip of rod 46 leaves coil 52, the tip of drill 18a will not as yet have entered coil 30 so that at this instant neither of the coils 52—30 contains a metallic element and, as was noted, this is the condition which causes the control means to produce a trouble indication. Similarly, if the tool 18a is subsequently replaced with a tool 18b which breaks, as illustrated in FIG. 5 of the drawings, no portion of the tool 18b will be disposed within the coil 30 at the instant that the rod 46 leaves coil 52, again establishing the condition for producing a trouble indication.

It will be observed that in the disclosed arrangement rods 44 and 46 differ in length in accordance with the difference in length of the drills 16 and 18, the requirement being that the distance between the coil 50 and the tip of rod 44 be equal to the distance, at that instant, between the tip of drill 16 and coil 28, and that the distance between coil 52 and the tip of rod 46 be equal, at that instant, to the distance between the coil 30 and the tip of drill 18. It will be apparent that equal length rods 44 and 46 could be employed if the extent to which those rods project to the left (FIG. 1) of bracket 42 is properly varied or if they were supported by separate brackets 40. Similarly, it will be apparent that the coils 50 and 52 could be spaced axially from one another upon the base 10 by a distance equal to the distance between the tips of the drills 16 and 18 in which case the tips of the rods 44 and 46 could be aligned, or that any combination of these modifications could be utilized. It will also be apparent that it is not significant whether the coils be secured to the base and the rods travel with the head 12, as shown, or whether these relationships be reversed.

In order to sense the conjoint inductance of the pairs of sensing and position-detecting coils such as the pair of coils 28—50, the control means must be capable of detecting changes in the total effective inductance of these two coils, and to that end the control means illustrated in FIG. 6 of the drawings comprises an oscillatory circuit of which the two coils 28 and 50 form a part. In the diagrammatic illustration of FIG. 6, rod 44 is shown to be connected to one end of the head 12 for convenience and the means for supporting inductance coil 50 has been shown spaced from the base 10.

In the illustrative arrangement disclosed, the inductance coils 28 and 50 are each center tapped and the resulting three terminals of each of the two coils are interconnected so that the coils 28 and 50 are connected in parallel. Vacuum tube V1A serves as the energy-supplying means of the oscillatory circuit including the coils 28 and 50, vacuum tube V1B and vacuum tube V2A serve as amplifying means and vacuum tube V2B controls the output relay CR1 which in turn controls relay CR2 to perform the output function.

The D.C. power supply for the several vacuum tubes comprises a transformer T1 having a primary winding which is connected to source S1 of alternating voltage, that primary circuit being fused with fuse F1 and selectively energizable under the control of switch SW1. The alternating voltage appearing across the secondary winding of transformer T1 is half-wave rectified by rectifier RE1 to produce a direct voltage across filter capacitor C1. This voltage is further filtered by means of the network including resistor R1 and capacitor C2. The direct voltage appearing across capacitor C2 is applied across the resistive element of potentiometer P1, the slider of that potentiometer being connected to the anode of tube V1A. The voltage appearing across filter capacitor C2 is also applied through load resistor R2 to the anode of vacuum tube V1B and through load resistor R3 to the anode of vacuum tube V2A. The direct voltage appearing across capacitor C1 is applied through the winding of control relay CR1, which winding is shunted by capacitor C3, to the anode of triode V2B.

The cathode of the oscillatory circuit triode V1A is connected to ground through degenerative feed-back resistor R4, No. 2 terminal of terminal strip TS, through the right-hand halves of coils 28 and 50 in parallel, and the No. 1 terminal of terminal strip TS. The control grid of triode V1A is connected to the left-hand terminals of coils 28 and 50. The anode of tube V1A is connected to the positive direct potential as above noted and is further connected to ground through bypass capacitor C4.

It will be seen that triode V1A is connected as a Hartley type of feed-back oscillator. While the resonant circuit including inductances 28 and 50 may also include additional lumped inductance and lumped capacitance, it is assumed that the capacitance of the conductors extending to the coils 28 and 50 in the illustrated showing serves to cause the circuit to oscillate at an appropriate frequency. The circuit is arranged so that tube V1A is normally quiescent, the circuit breaking into oscillation only if, at some instant of time, no portion of rod 44 is disposed within coil 50 at the same instant that no portion of tool 16 is disposed within coil 28.

When such oscillation occurs, the alternating voltage signal appearing between the No. 2 terminal of terminal strip TS and ground, that is, the alternating voltage signal appearing across the right-hand halves of coils 28 and 50, is applied between the control grid of amplifier V1B and ground. Since the anode of that tube is energized as aforesaid and since the cathode of that tube is connected to ground through resistor R5, an amplified alternating voltage is developed across load resistor R2 which is applied to vacuum tube V2A through the coupling network comprising capacitor C5 and resistor R6. The cathode of amplifier V2A is connected to ground through resistor R7 and the tube operates as an amplifier, producing an amplified alternating voltage across load resistor R3. This alternating voltage is applied through capacitor C6 and developed across resistor R8. The alternating voltage across resistor R8 is half-wave rectified by means of rectifier RE2, filtered by means of capacitor C7, and applied to the control grid of tube V2B the cathode of which is connected to ground through resistor R9. Tube V2B is normally conducting, the anode current thereof flowing through the winding of relay CR1 so that relay CR1 is normally operated. Rectifier RE2 is poled so that the direct voltage which is applied between the control grid of tube V2B and ground in response to the rectification of the alternating voltage signal is negative, tending to drive tube V2B to or toward cutoff, thereby reducing the flow of plate current to the point where relay CR1 will release.

When the circuit is placed in operation by the closure of switch SW1, assuming a proper tool to be disposed in the head 12, relay CR1 operates to close its normally open contacts and to prepare an energizing circuit for relay CR2 which may be traced from the right-hand terminal of source S1, winding of relay CR2, No. 6 terminal on terminal strip TS, the normally open contacts of relay CR1, the No. 8 terminal on terminal strip TS, and to one contact of the switch SW2, as well as to one contact of the No. 1 contacts of relay CR2, the other contacts of both of which are connected to the left-hand terminal of source S1. Since the No. 1 contacts of relay CR2 and switch SW2 are both open at this time, relay CR2 will not operate even though relay CR1 is operated. However, when switch SW2 is momentarily depressed to close the contacts, the energizing circuit for relay CR2 is completed and the No. 1 contacts thereof are closed so that relay CR2 is locked operated under the control of relay CR1 even though reset button SW2 is released.

Relay CR2, in operating, opens its No. 2 contacts to extinguish the lamp L1 to indicate that the circuit is now ready for operation and closes its No. 3 contacts to energize the machine control. The machine control is the equipment for controlling the machine tool including the head 12 and may take any suitable form. It may be observed that the No. 3 contacts of relay CR2 may be employed in conjunction with the circuitry illustrated in the above-identified patent to control the starter of the machine tool. Thus, the starter of the machine tool in the noted patent is identified 182 in that patent and the No. 3 contacts of relay CR2 may be connected in series with that starter as by opening lead 192 or 194 in FIG. 3 of the above-identified patent and inserting the No. 3 contacts of relay CR2 of the subject application therein. The output relays of the other arrangements disclosed herein may be connected in the system of the noted patent in a similar fashion.

If during the operation of the equipment, a condition exists in which rod 44 is out of coil 50 at the same instant that no portion of tool 16 is within coil 28, the oscillatory circuit will break into oscillation, the plate current of tube V2B will be reduced, and relay CR1 will be released. When this occurs, relay CR1 will open its normally open contacts (closing its normally closed contacts to establish a signal condition between the No. 6 and No. 7 terminals of terminal strip TS for any appropriate purpose) to terminate energization of relay CR2. Relay CR2, in releasing, closes its No. 2 contacts to energize lamp L1 to indicate the existence of a trouble condition, and opens its No. 3 contacts to shut down the machine by appropriately signaling the machine control. If, shortly thereafter, some portion of tool 16 enters coils 68 or some portion of rod 44 enters coil 50, the oscillator will again be rendered quiescent, and relay CR1 will again be operated, but since the energizing circuit for relay CR2 is interrupted due to the fact that the No. 1 contacts of relay CR2 are opened at the same time that switch SW2 is opened, relay CR2 cannot reoperate and the existence of a trouble condition will continue to be indicated. When the operator has corrected the condition, as by replacing the tool, the equipment can again be placed in operation by momentary closure of switch SW2.

It will be observed that similar equipment can be associated with the sensing and position-determining coils 30 and 52, with the No. 3 contacts of the CR2 relay in that circuit desirably being connected in series with the No. 3 contacts of relay CR2 in the circuit of FIG. 6 so that a defective condition with respect to either of the two illustrated cutting tools will cause the machine tool to be shut down.

In the modified arrangement illustrated in FIGS. 7 through 11 of the drawings, the head, the base, the drills, the workpiece, and the drill sensing means are the same as those above discussed and bear similar designations. However, in this arrangement, in lieu of the head-position detecting coil and rod arrangement, limit switch means are employed to selectively energize the sensing and/or control means at appropriate points in the movement of the head 12.

Figures 7, 8:
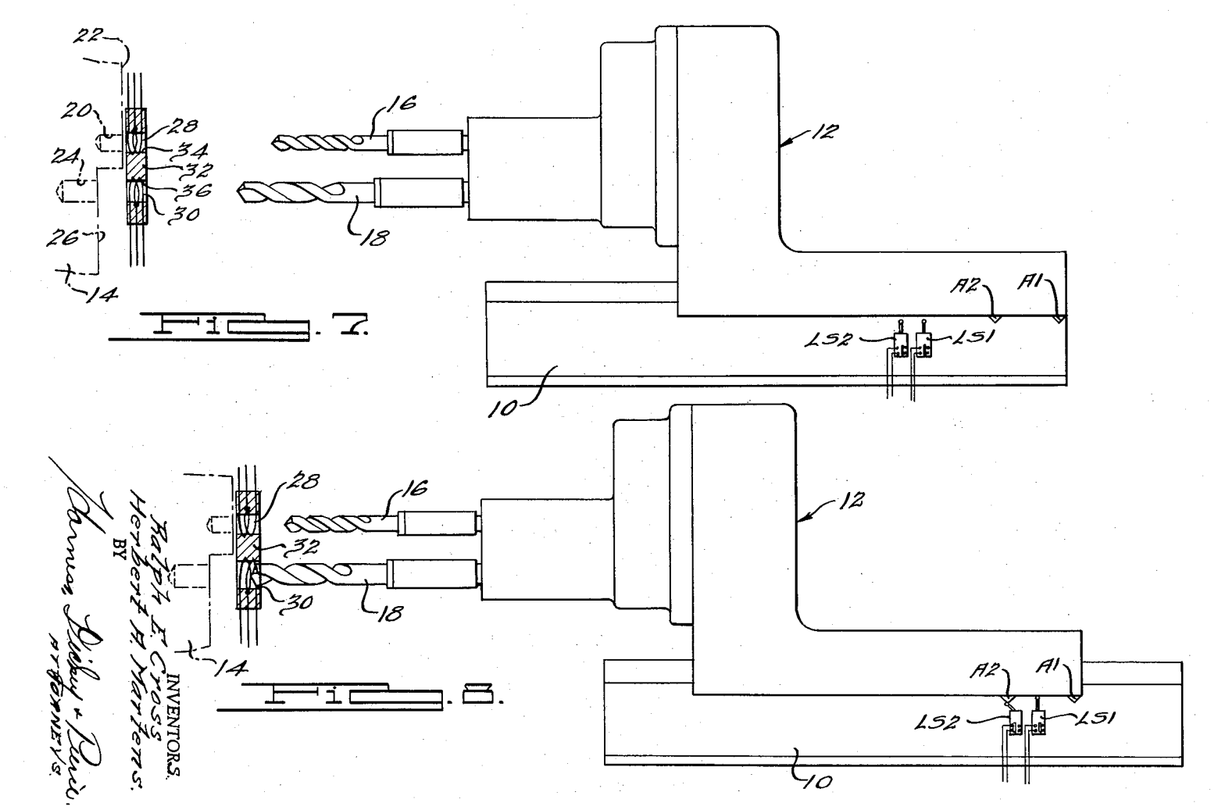
FIG. 7 is a side elevational view of a machine tool similar to that of FIG. 1 but with modified position-detecting means, the head being shown in a retracted position.
FIG. 8 is a view of the machine of FIG. 7 with the head being shown in an intermediate position of advance.
Figure 9:
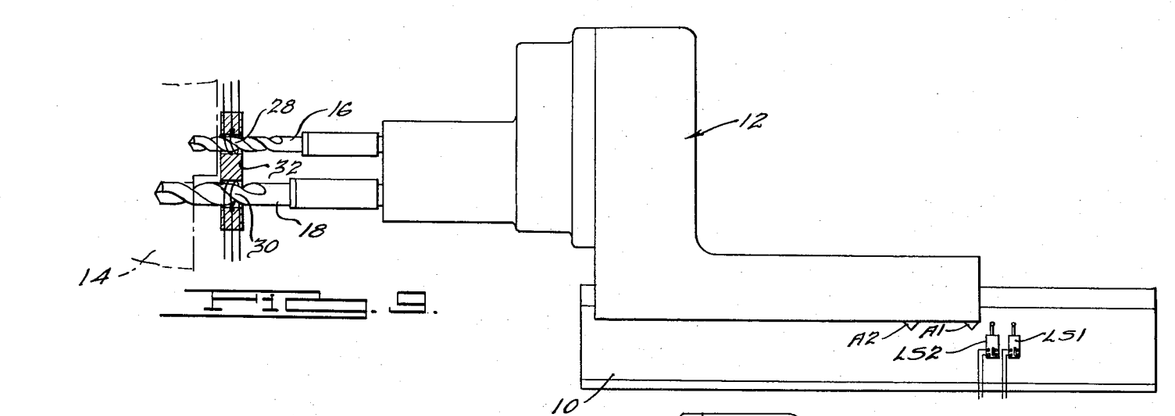
FIG. 9 is a view of the machine of FIG. 7 with the head being shown in an advanced position.

In the illustrated arrangement, limit switches LS1 and LS2 are mounted upon the base 10 and cooperating actuators A1 and A2 are secured to and are moved by the head 12. Limit switch LS1 and its actuator A1 are individual to the drill 16, while limit switch LS2 and its actuator A2 is individual to the drill 18. The actuating levers of the limit switches LS1 and LS2 are offset from one another in a horizontal sense and transversely of the machine and the actuators or dogs A1 and A2 are correspondingly offset so that actuator A2 will not engage or actuate limit switch LS1 and so that actuator A1 will not engage or actuate limit switch LS2.

Since drill 18 is illustrated to be longer than drill 16, limit switch LS2 will be actuated before limit switch LS1. As the head 12 moves from the FIG. 7 position into the FIG. 8 position, actuator A2 is moved with the head into actuating relationship with the lever of limit switch LS2 producing, in the illustrated arrangement, a closure of those limit switch contacts. Limit switch LS2 and actuator A2 are adjusted so that this contact closure occurs at the instant and position that the tip of a proper length and unbroken drill 18 is just entering coil 30. As a result, the control means including the sensing coil will detect the presence of the metallic drill within the coil and will not transmit a trouble indication.

As the head 12 advances further to the left, limit switch LS2 will be released, and at a still furtther position of advance, actuator A1 will trip limit switch LS1 to produce closure of its contacts. Again, limit switch LS1 and actuator A1 are adjusted so that this contact closure occurs just as the tip of a proper length and unbroken drill 16 enters coil 28, and again there will be no trouble indication transmitted. As the head 12 advances still further to the left towards and to the FIG. 9 position, limit switch LS1 is released.

Figure 10:
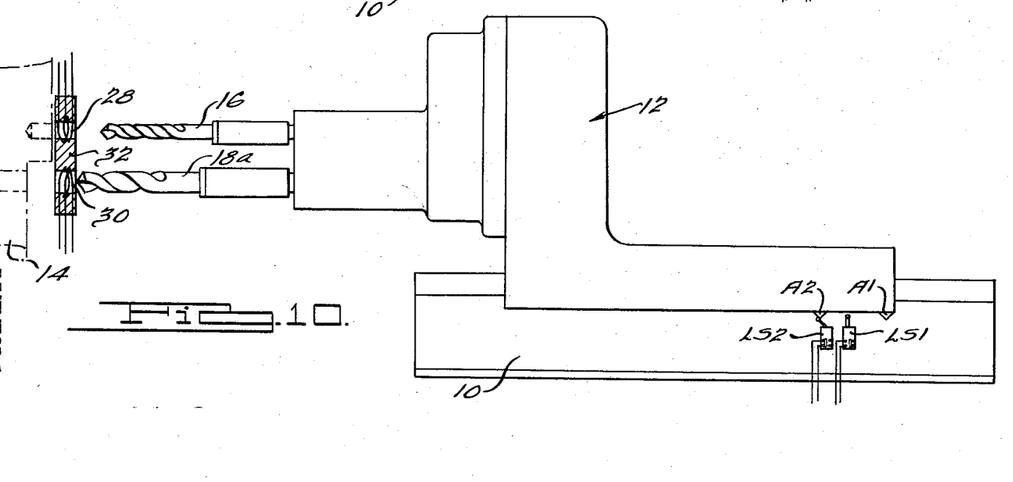
FIG. 10 is a view of the machine of FIG. 7 with the head being shown in the position of FIG. 8 but in which one of the cutting tools is set too short.

If when the limit switch LS2 is actuated the tool 18a which is then associated with head 12 is too short, as illustrated in FIG. 10, the control means will detect the absence of a metallic object within the coil 30 and will produce a trouble indication. Similarly, at the same position of the head 12, if the tool 18b which is then in the head 12 is broken, as illustrated in FIG. 11, a trouble indication will also be transmitted.

It will be observed that in both illustrated arrangements, a test of the condition of the tool will be made both upon the forward and upon the return stroke of the head.

Figures 11, 12:
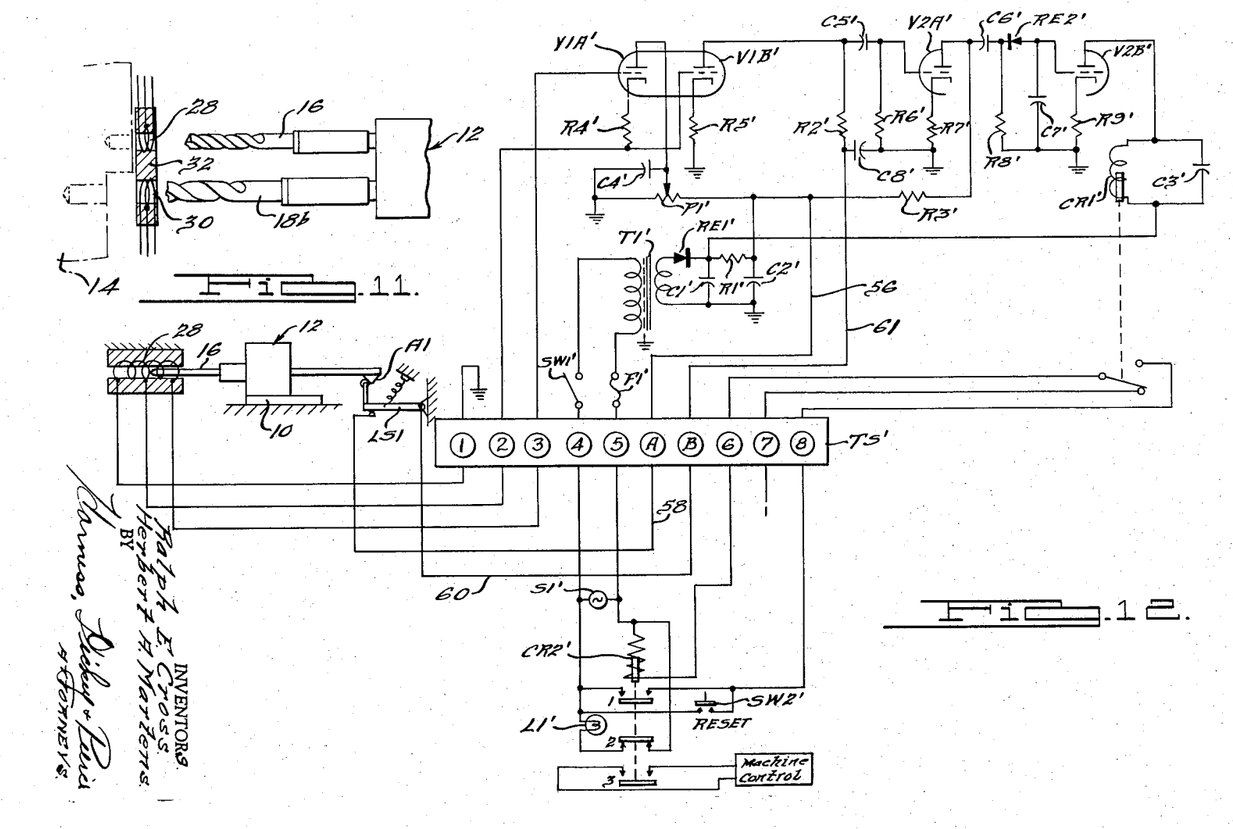
FIG. 11 is a view of the machine of FIG. 7 in the position of FIG. 8 but in which one of the cutting tools is broken.
FIG. 12 is a schematic representation of another form of control equipment for association with the machine tool of FIGS. 7 through 11.

A control means suitable for use in conjunction with the equipment illustrated in FIGS. 7 through 11 of the drawings is shown schematically in FIG. 12. In that view, the left-hand terminal of sensing coil 28 is connected to ground through the No. 1 terminal of terminal strip TS′, the right-hand terminal of that coil is connected via the No. 3 terminal of terminal strip TS′ to the control grid of vacuum tube V1A′ and the center tap of coil 28 is connected via the No. 2 terminal of terminal strip TS′ and through the resistor R4′ to the cathode of vacuum tube V1A′. The oscillatory circuit including inductance coil 28 and vacuum tube V1A′ is adjusted so that the system will oscillate at an appropriate frequency if but only if no iron-containing member is disposed within the coil 28 at the time that the system is energized.

Limit switch LS1 controls the time and head position at which sensing of the tool condition occurs by controlling the energization of the control means. In the illustrated arrangement, this is accomplished by utilizing the electrical contacts of limit switch LS1 to control the plate circuit of amplifier V1B′. Except for this feature, the control circuit illustrated in FIG. 12 operates identically to the control circuit illustrated in FIG. 6 and previously described and corresponding parts have been correspondingly designated with the addition of a prime symbol.

In order to supply plate voltage to vacuum tube V1B′, the direct voltage appearing across filter capacitor C2′ is applied via conductor 56, terminal A of terminal strip TS′, conductor 58, contacts of limit switch LS1, conductor 60, terminal B of terminal strip TS′, conductor 61, load resistor R2′ and to the anode of tube V1B′, the cathode of that tube being grounded through resistor R5′. It will be observed that the limit switch electrical contacts do not control the plate circuit for vacuum tube V2B′ and consequently relays CR1′ and CR2′ will normally be operated even though the contacts of limit switch LS1 be open. When the head is fully retracted, the contacts of limit switch LS1 will be open and tool 16 will be spaced from the sensing coil 28. Consequently, the oscillatory circuit including vacuum tube V1A′ will break into oscillation and apply an alternating-voltage signal to the control grid of vacuum tube V1B′. However, since the plate circuit for that amplifier is open at the contacts of limit switch LS1, no signal will be applied to vacuum tube V2A′ or to vacuum tube V2B′, and relays CR1′ and CR2′ will remain energized. If, at the time that the contacts of limit switch LS1 are closed, a portion of tool 16 is disposed within coil 28, the oscillatory circuit including vacuum tube V1A′ will not break into oscillation and the condition of relays CR1′ and CR2′ will remain unchanged. However, if at the instant the contacts of limit switch LS1 are closed, no iron-containing object is disposed within coil 28 as the result of a short or broken condition of the tool, the oscillatory circuit including vacuum tube V1A′ will break into oscillation, vacuum tube V1B′ will apply an amplified signal to vacuum tube V2A′ which will result in the application of a voltage to vacuum tube V2B′ tending to drive that tube towards cutoff, and relays CR1′ and CR2′ will be released, producing a trouble indication.

Similar circuitry will, of course, be provided for testing the condition of tool 18.

The described arrangements have been designed to determine whether the tool is broken and whether the tool is set too short. It will be apparent that the equipment can be readily modified to permit the detection of tools which are set too long if there is a need for such a capability. For example, to detect if tool 18 is set too long, an additional limit switch can be mounted upon the base 10 in a position to be actuated by actuator A2 an appropriate distance prior to the point at which a normal length tool will enter coil 30. That additional limit switch should have a first set of normally open contacts connected in parallel with the contacts of limit switch LS1 shown in FIG. 12 of the drawings so that actuation of the additional limit switch will energize the illustrated control means by connecting plate potential to vacuum tube V1B′. In one arrangement, that additional limit switch could also be provided with a second set of normally open contacts connected in parallel with the normally open contacts of relay CR1′, that is, the second set of contacts on the limit switch are connected between the No. 6 and No. 8 terminals on terminal strip TS′. This set of contacts would serve, when closed, to hold relay CH2′ operated even though relay CR1′ releases. The additional limit switch should further be provided with a third set of normally open contacts connected in a series including a source of energy, an additional set of normally open contacts of relays CR1′, and the winding of an auxiliary relay which is preferably slow to operate, requiring a longer period to operate than relay CR1′ requires to release. The auxiliary relay should be provided with a set of normally closed contacts connected in series with the machine control and in series with the No. 3 contact of relay CR2′. When the additional limit switch is actuated, the first contact thereof will energize the control means and the second contact thereof will hold relay CR2′ operated. If the drill 16 is not at that instant within the coil 28, that is, if tool 16′ is not set too long, the oscillatory circuit will break into oscillation and relay CR1′ will be released. The release of relay CR1′ will open the provided additional pair of normally open contacts of relay CR1′ and prevent energization of the provided auxiliary relay. Therefore, the normally closed contacts of the auxiliary relay will not be opened and the operation of the machine control will not be interrupted. If, on the other hand, the tool 16 is too long so that its tip has entered coil 28 at the instant of this testing, the oscillatory circuit will not break into oscillation and relay CR1′ will remain operated. As a result, its additional provided contacts will remain closed and an energizing circuit will be completed for the auxiliary relay due to the closure of the third set of contacts of the additional limit switch. After an appropriate interval, the auxiliary relay will operate to open its normally closed contacts and to terminate operation of the machine tool. By insuring that the additional limit switch is released prior to the time that limit switch LS1 is actuated, this additional equipment will in no way interfere with the operation of the previously described apparatus for detecting broken or short tools.

Figures 13, 14, 15:
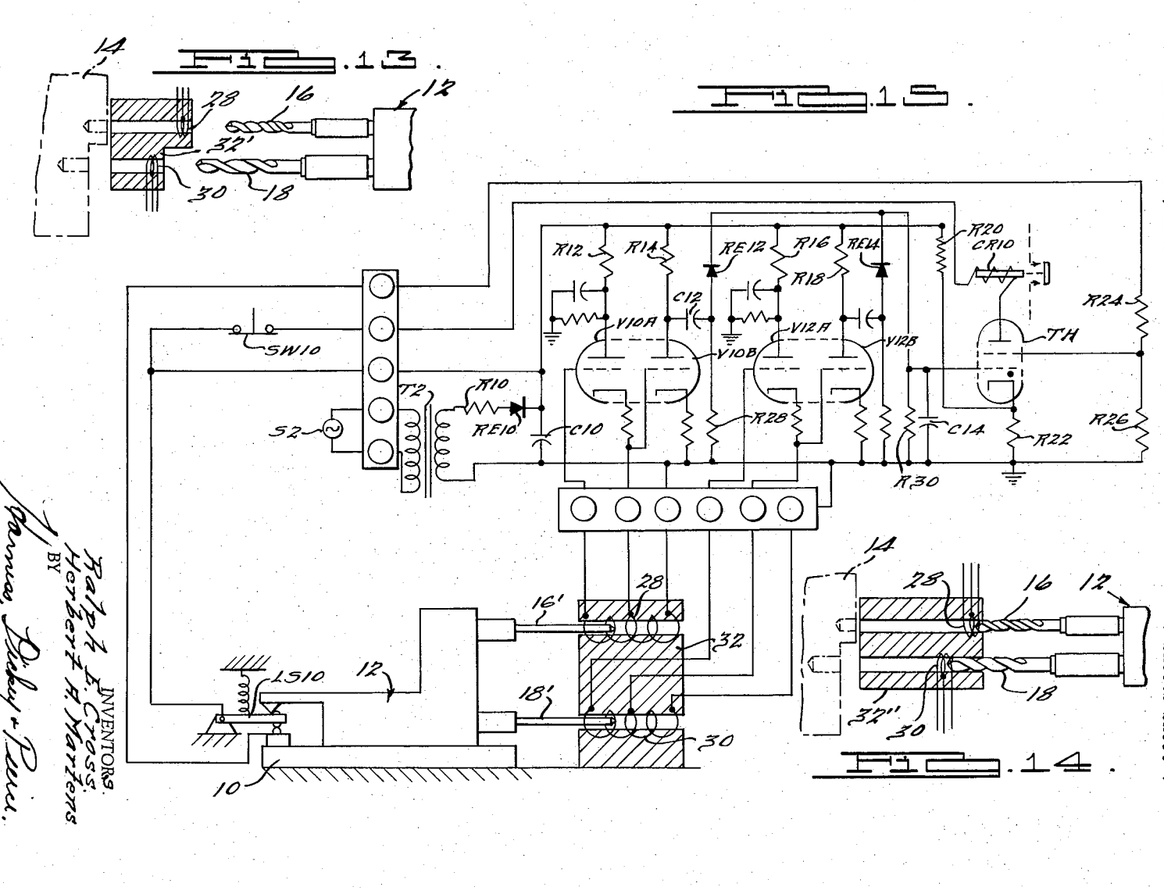
FIG. 13 is a fragmentary view of a modified arrangement in which the sensing coils are located in accordance with the appropriate lengths of the associated drills.
FIG. 14 is a fragmentary view of a modified arrangement in which the sensing coils are in continuous sensing relation with correct tools.
FIG. 15 is a schematic representation of a control equipment for use with a plurality of cutting tools.

In the previously discussed arrangements, one head position-detecting means is provided for each of the two disclosed cutting tools. If both cutting tools were the same length, it would be possible to utilize but one head position-detecting means. Thus, as an example, if tools 16 and 18 in FIG. 7 of the drawings were of equal length, then both limit switches LS1 and LS2 would properly be at the same position and, accordingly, one limit switch would suffice. If the cutting tools are of different lengths, a single head position-detecting means may be employed if the tool sensing coils are staggered axially from the workpiece in accordance with the differences in the length of the cutting tools. This can be accomplished by the use of a stepped bushing plate 32' as illustrated in FIG. 13 of the drawings. In this arrangement, the distance between the tip of drill 16 and the coil 28 is equal to the distance between tool 18 and coil 30 as long as both tools 16 and 18 are unbroken and properly set. Since the tips of the two cutting tools will enter their respective coils concurrently, but a single limit switch or other head position-detecting means may be employed.

It will also be perceived that broken tools or tools that are set too short may be detected without any head position-detecting means if the sensing coils are arranged so that a normal length, unbroken cutting tool never leaves its associated coil. This may be accomplished, in one fashion, by supporting the coils upon a traveling bushing plate or upon another such member which is retracted with the head and which, as the head advances, moves therewith until it reaches the preselected relationship with the workpiece at which time the forward motion of the bushing plate terminates and the drills continue to advance into cutting relationship with the workpiece.

FIG. 14 illustrates an arrangement in which the member 32" is stationary relative to the workpiece. The coils 28 and 30 are supported within the member 32" in appropriate positions so that normal length and unbroken tools 16 and 18 are just positioned within the coils 28 and 30, respectively, when the head 12 is fully retracted. Either the head 12 or the member 32" should be movable from the operational relationship shown to a position in which the tools can be replaced.

With such an arrangement, normal length and unbroken cutting tools will never leave the coils 28 and 30 so that the control means can be continuously energized. A trouble indication will not be produced until, at some time, a portion of the drill is not disposed within one of the two sensing coils. This will occur only if the tool is missing, too short, or broken. The circuit of FIG. 12 may be modified to operate in this fashion by simply connecting a jumper across the electrical contacts of limit switch LS1 so as to short out that limit switch.

The circuit of FIG. 15 differs from those previously described in a number of aspects. Primarily, the unit is more rapid in its operation due to the provision of a thyratron as an output device, and it is more economical where the conditions of plural drills are to be sensed concurrently in that certain of the equipment which would otherwise be individual to the several cutting tools is shared by those tools. The circuit further differs in the manner of controlling the energization of the control means.

The circuit shown in FIG. 15 includes a D.C. power supply including a transformer T2 the primary winding of which is connected (such as through suitable switching means) to a source of alternating voltage S2. The alternating voltage appearing across the secondary winding of transformer T2 is applied through a current limiting resistor R10, half-wave rectified by means of rectifier RE10 and filtered by means of capacitor C10. The direct voltage appearing between the upper terminal of capacitor C10 and ground is applied through load resistor R12 of triode V10A, through load resistor R14 to the anode of triode V10B, through load resistor R16 to the anode of triode V12A, through load resistor R18 to the anode of triode V12B and to ground through voltage divider resistors R20 and R22, the positive direct voltage appearing at the upper terminal of resistor R22 being applied to the cathode of thyratron TH.

The direct voltage appearing between the upper terminal of capacitor C10 and ground is also applied through the normally closed reset switch SW10 and through the winding of relay CR10 to the anode of thyratron TH. The positive direct voltage appearing across the capacitor C10 is also applied across a circuit including the electrical contacts of limit switch LS10, resistor R24 and resistor R26. The positive direct voltage appearing at the upper terminal of resistor R24 when the contacts of limit switch LS10 are closed is applied to the second control electrode of thyratron TH.

Vacuum tube V10A forms a part of an oscillatory circuit also including coil 28 and the capacitance of the leads interconnecting coil 28, while vacuum tube V12A forms a part of an oscillatory circuit also including coil 30 and the capacitance of the conductors interconnecting coil 30 and the vacuum tube. These circuits are connected as Hartley oscillators similar to those previously described. Coil 28 is individual to drill 16' and coil 30 is individual to drill 18', both of which are carried by head 12. Whenever drill 16' is separated from coil 28, the oscillatory circuit including coil 28 and vacuum tube V10A breaks into oscillation. The oscillatory signal is directly coupled to vacuum tube V10B, and the resulting amplified alternating voltage is applied through capacitor C12 and developed across resistor R28. The voltage across resistor R28 is half-wave rectified by means of rectifier RE12 and the resulting unidirectional voltage is developed across resistor R30 which is shunted by filter capacitor C14. The voltage appearing across resistor R30 and capacitor C14 is applied to the first control grid of thyratron TH. Rectifier RE12 is poled so that this voltage is positive relative to ground.

Thyratron TH acts as a coincidence circuit, requiring the concurrent application of appropriate direct voltages to both of the control electrodes thereof before the thyratron will fire. If limit switch LS10 is open, no direct voltage will be applied to the second control electrode of the thyratron and the thyratron will not fire even though the noted direct voltage signal is applied to the first control electrode thereof; however, if limit switch LS10 is closed at the time that the direct voltage signal is applied to the first control electrode, thyraton TH will conduct and operate relay CR10. Relay CR10 is provided with a set of normally open contacts adapted to be connected in series with a machine control circuit in the manner above discussed and may be provided with additional contacts for additional control purposes if desired.

In a similar manner, the oscillatory circuit including vacuum tube V12A and coil 30 will break into oscillation whenever no portion of tool 18' is disposed in proper relation with that coil, and the oscillatory signal will be amplified and rectified to produce a positive direct voltage at the first control electrode of thyratron TH, causing that thyratron to fire if, at that instant, limit switch LS10 is closed.

In the arrangement illustrated in FIG. 15, it is assumed that the two tools 16' and 18' are equal in set length and a single limit switch LS10 is correspondingly provided. The same head position-detecting arrangement may be employed even though the several cutting tools are of different lengths if, as previously noted, the axial positions of the several sensing coils are adjusted so that, at any time, the distance between each of the properly set tools and its respective coil is equal to the distance between each of the other properly set tools and their respective coils. It will further be observed that if the coils are positioned so that properly set and unbroken tools never leave their respective coils, as above discussed, then the contacts of limit switch LS10 can be jumpered.

The arrangement of FIG. 14, in which unbroken proper-length tools do not leave the sensing coils, is advantageous particularly in that no head position-sensing means is required. However, in many multiple cutting tool units, the length of one cutting tool and its requisite length of travel may make it difficult or impossible to associate a fixed sensing means in continuous sensing relation with another one of the cutting tools. As one specific example, continuous fixed-coil sensing is not feasible if the length of travel of the cutting tool is greater than the length of the cutting tool.

Under such circumstances, the sensing of the length and condition of the cutting tool at a point during the travel of the tool as disclosed herein is particularly advantageous and in many circumstances offers the only fully satisfactory solution to the problem. Since the coil does not have to be in continuous sensing relationship with the tool, it can be disposed adjacent the workpiece and can properly perform its sensing function even though the cutting tool is fully withdrawn therefrom during each cycle of operation.

For clarity of illustration and exposition, the establishment of a sensing relation during the movement of the tool relative to the sensing coil has been assumed to occur at the instant that the tip of a ferrous element enters the coil, but it will be recognized that the sensing relationship can be established when the tip is spaced from the coil a preselected distance or only after a preselected amount of the element has entered the coil, as desired.

While it will be apparent that the embodiments of the invention herein disclosed are well calculated to fulfill the objects of the invention, it will be appreciated that the invention is susceptible to modification, variation and change without departing from the proper scope or fair meaning of the subpoined claims.

What is claimed is:

1. In a machine having a cutting tool for performing a cutting operation upon a workpiece and a head supporting the cutting tool and movable from a first position spaced from the workpiece to a second position in which the tip of the cutting tool is in cutting engagement with the workpiece, means for detecting when the length of the cutting tool is improper comprising sensing means disposed adjacent the path of travel of the cutting tool and in critical sensing relationship with portions of the cutting tool at a preselected position of the head between said first and second positions of the head during the travel of the cutting tool, control means including said sensing means effective when enabled to produce a preselected output indication if a portion of the cutting tool is in sensing relation with said sensing means and a different preselected output indication if no portion of the cutting tool is in sensing relation with said sensing means, and enabling means including means movable by the head for enabling said control means at said preselected position of the head.

2. In a machine having a cutting tool for performing a cutting operation upon a workpiece and a head supporting the cutting tool and movable from a first position spaced from the workpiece to a second position in which the tip of the cutting tool is in cutting engagement with the workpiece, means for detecting when the length of the cutting tool is improper comprising sensing means disposed adjacent the path of travel of the cutting tool and in critical sensing relationship with the tip of a proper length cutting tool at a preselected position of the head between said first and second positions of the head during the travel of the cutting tool, control means including said sensing means effective when enabled to produce a preselected output indication if a portion of the cutting tool is in sensing relation with said sensing means and a different preselected output indication if no portion of the cutting tool is in sensing relation with said sensing means, and enabling means including means movable by the head for enabling said control means only when the head has moved to said preselected position.

3. In a machine having a cutting tool for performing a cutting operation upon a workpiece and a head supporting the cutting tool and movable from a first position spaced from the workpiece to a second position in which the tip of the cutting tool is in cutting engagement with the workpiece, means for detecting when the length of the cutting tool is improper comprising sensing means disposed adjacent the path of travel of the cutting tool and in critical sensing relationship with portions of the cutting tool at a preselected position of the head between said first and second positions of the head during the travel of the cutting tool, control means including said sensing means effective which enabled to produce a preselected output indication if a portion of the cutting tool is in sensing relation with said sensing means and a different preselected output indication if no portion of the cutting tool is in sensing relation with said sensing means, and enabling means including means movable by the head for enabling said control means at said preselected position of the head, said sensing means comprising an annular inductance coil adapted to accept and surround a portion of the cutting tool and having an effective value of inductance which differs when a portion of the cutting tool is therewithin than when the cutting tool is withdrawn from said inductance coil.

4. In a machine having a cutting tool for performing a cutting operation upon a workpiece and a head supporting the cutting tool and movable from a first position spaced from the workpiece to a second position in which the tip of the cutting tool is in cutting engagement with the workpiece, means for detecting when the length of the cutting tool is improper comprising sensing means disposed adjacent the path of travel of the cutting tool and in critical sensing relationship with portions of the cutting tool at a preselected position of the head between said first and second positions of the head during the travel of the cutting tool, control means including said sensing means effective when enabled to produce a preselected output indication if a portion of the cutting tool is in sensing relation with said sensing means and a different preselected output indication if no portion of the cutting tool is in sensing relation with said sensing means, and enabling means including means movable by the head for enabling said control means at said preselected position of the head, said sensing means comprising an annular inductance coil adapted to accept and surround a portion of the cutting tool and having an effective value of inductance which differs when a portion of the cutting tool is therewithin than when the cutting tool is withdrawn from said inductance coil, said control means including an oscillatory circuit having said inductance coil as an element thereof.

5. In a machine having a cutting tool for performing a cutting operation upon a workpiece and a head supporting the cutting tool and movable from a first position spaced from the workpiece to a second position in which the tip of the cutting tool is in cutting engagement with the workpiece, means for detecting when the length of the cutting tool is improper comprising sensing means disposed adjacent the path of travel of the cutting tool and in critical sensing relationship with portions of the cutting tool at a preselected position of the head between said first and second positions of the head during the travel of the cutting tool, control means including said sensing means effective when enabled to produce a preselected output indication if a portion of the cutting tool is in sensing relation with said sensing means and a different preselected output indication if no portion of the cutting tool is in sensing relation with said sensing means, and enabling means including means movable by the head for enabling said control means at said preselected position of the head comprising limit switch means and actuating means one of which is secured to the head for movement therewith and the other of which is stationary.

6. In a machine having a cutting tool for performing a cutting operation upon a workpiece and a head supporting the cutting tool and movable from a first position spaced from the workpiece to a second position in which the tip of the cutting tool is in cutting engagement with the workpiece, means for detecting when the length of the cutting tool is improper comprising sensing means disposed adjacent the path of travel of the cutting tool and in critical sensing relationship with portions of the cutting tool at a preselected position of the head between said first and second positions of the head during the travel of the cutting tool, control means including said sensing means effective when enabled to produce a preselected output indication if a portion of the cutting tool is in sensing relation with said sensing means and a different preselected output indication if no portion of the cutting tool is in sensing relation with said sensing means, and enabling means including means movable by the head for enabling said control means at said preselected position of the head comprising limit switch means and actuating means one of which is secured to the head for movement therewith and the other of which is stationary, said actuating means actuating said limit switch means when the head has moved to said position in which the tip of a proper length cutting tool is in sensing relation with said sensing means.

7. In a machine having a cutting tool for performing a cutting operation upon a workpiece and a head supporting the cutting tool and movable from a position spaced from the workpiece to a position in which the tip of the cutting tool is in cutting engagement with the workpiece, means for detecting when the length of the cutting tool is improper comprising sensing means disposed adjacent the path of travel of the cutting tool and in sensing relationship with portions of the cutting tool during the travel of the cutting tool, control means including said sensing means effective when enabled to produce a preselected output indication if a portion of the cutting tool is in sensing relation with said sensing means, and enabling means including means movable by the head for enabling said control means at a preselected position of the head, said sensing means comprising an annular inductance coil adapted to accept a portion of the cutting tool and having an effective value of inductance which differs when a portion of the cutting tool is therewithin than when the cutting tool is withdrawn from said inductance coil, said energizing means comprising a rod and an additional inductance coil one of which is secured to the head for movement therewith and the other of which is stationary, said rod and said additional inductance coil being moved into and out of sensing relationship as the head moves between said positions, said rod being moved from sensing relation with said additional inductance coil at the point at which the tip of a proper length cutting tool is moved into sensing relation with said sensing means.

8. In a machine having a cutting tool for performing a cutting operation upon a workpiece and a head supporting the cutting tool and movable from a position spaced from the workpiece to a position in which the tip of the cutting tool is in cutting engagement with the workpiece, means for detecting when the length of the cutting tool is improper comprising sensing means disposed adjacent the path of travel of the cutting tool and in sensing relationship with portions of the cutting tool during the travel of the cutting tool, control means including said sensing means effective when enabled to produce a preselected output indication if a portion of the cutting tool is in sensing relation with said sensing means, and enabling means including means movable by the head for enabling said control means at a preselected position of the head, said sensing means comprising an annular inductance coil adapted to accept a portion of the cutting tool and having an effective value of inductance which differs when a portion of the cutting tool is therewithin than when the cutting tool is withdrawn from said inductance coil, said energizing means comprising a rod and an additional inductance coil one of which is secured to the head for movement therewith and the other of which is stationary, said rod and said additional inductance coil being moved into and out of sensing relationship as the head moves between said positions, said rod being moved from sensing relation with said additional inductance coil at the point at which the tip of a proper length cutting tool is moved into sensing relation with said sensing means, said control means including an oscillatory circuit having both of said inductance coils as elements thereof.

9. In a machine having a plurality of cutting tools for performing a plurality of cutting operations at the same time upon a workpiece and a head supporting the cutting tools and movable from a first position spaced from said workpiece to a second position at which the tips of the cutting tools are in cutting engagement with the workpiece, means for detecting when the length of any of the cutting tools is improper comprising a plurality of sensing means individual to the cutting tools and disposed in the paths of travel of the cutting tools and in critical sensing relationship with portions of the cutting tools at a preselected position of the head between said first and second positions of the head during the travel of the cutting tools, an output device, control means including said sensing means effective when enabled to control said output device in accordance with whether portions of each of the cutting tools are in sensing relationship with the individual sensing means and a different preselected output indication if no portion of the cutting tool is in sensing relation with said sensing means, and enabling means including means movable by the head for enabling said control means at said preselected position of the head.

10. In a machine having a plurality of cutting tools for performing a plurality of cutting operations at the same time upon a workpiece and a head supporting the cutting tools and movable from a first position spaced from said workpiece to a second position at which the tips of the cutting tools are in cutting engagement with the workpiece, means for detecting when the length of any of the cutting tools is improper comprising a plurality of sensing means individual to the cutting tools and disposed in the paths of travel of the cutting tools and each in critical sensing relationship with the tip of a proper length cutting tool at a preselected position of the head between said first and second position of the head during the travel of the cutting tools, an output device, control means including said sensing means effective when enabled to control said output device in accordance with whether portions of each of the cutting tools are in sensing relationship with the individual sensing means, and enabling means including means movable by the head for enabling said control means only when the head has moved to said preselected position.

11. In a machine having a cutting tool for performing a cutting operation upon a workpiece, a head supporting the cutting tool and movable from a first position spaced from the workpiece to a second position in which the tip of the cutting tool is in cutting engagement with the workpiece, and a bushing plate positioned proximate the workpiece and having a bushing for accepting and guiding the cutting tool during its movement into cutting engagement with the workpiece, the combination of means for detecting when the length of the cutting tool is improper comprising an annular inductance coil supported by the bushing and surrounding the tip of a proper length cutting tool when the cutting tool is disposed within the bushing at a preselected position of the head between said first and second positions of the head, control means including said sensing means effective when enabled to produce a preselected output indication if a portion of the cutting tool is in sensing relation with said sensing means and a different preselected output indication if no portion of the cutting tool is in sensing relation with said sensing means, and enabling means including means movable by the head of enabling said control means only when the head is moved to said preselected position.

12. In a machine having a plurality of cutting tools for performing cutting operations on a workpiece and a head supporting the cutting tools and movable from a first position spaced from the workpiece to a second position in which the tips of the cutting tools are in cutting engagement wtih the workpiece, the cutting tools being of differing lengths, the combination of means for detecting when the length of any one of the cutting tools is improper comprising an inductance coil for each of the cutting tools disposed in the path of travel of the individual cutting tool and in critical sensing relationship with the tip of the individual cutting tool at a preselected position of the head between said first and second positions of the head during the travel of the individual cutting tool, means for supporting said inductance coils at different distances from the head in accordance with the lengths of the individual cutting tools, the distance between the tip of each cutting tool and its respective inductance coil being equal to the distance between the tip of each other cutting tool and its respective inductance coil, control means including said inductance coils effective when energized to produce a preselected output indication only when portions of all of the cutting tools are concurrently in sensing relation with the individual inductance coils and a different preselected output indication when no portion of any one of the cutting tools is in sensing relation with its undivided induction coil, and enabling means including means movable by the head for enabling said control means at said preselected position of the head.

13. In a machine having a plurality of cutting tools for performing cutting operations on a workpiece and a head supporting the cutting tools and movable from a first position spaced from the workpiece to a second position in which the tips of the cutting tools are in cutting engagement with the workpiece, the cutting tools being of different lengths, the combination of means for detecting when the length of any one of the cutting tools in improper comprising an inductance coil for each of the cutting tools disposed in the path of travel of the individual cutting tool and in critical sensing relationship with portions of the individual cutting tool during the travel of the individual cutting tool, means for supporting said inductance coil at different distances from the head in accordance with the lengths of the individual cutting tools, the distance between the tip of each cutting tool and its respective inductance coil being equal to the distance between the tip of each other cutting tool and its respective inductance coil, all of said tips entering said critical sensing relation with their individual inductance coils at a preselected position of said head between said first and second positions and while said head is moving between said first and second positions control means including said sensing means effective when enabled to produce a preselected output indication only if portions of all of the cutting tools are in sensing relation with the individual sensing means, and single enabling means including means movable by the head for enabling said control means at said preselected position of the head.

14. In a machine having a plurality of cutting tools of different lengths for performing a plurality of cutting operations at the same time upon a workpiece and a head supporting the cutting tools and movable from a first position in which the tips of the cutting tools are spaced from said workpiece to a second position in which the tips of the cutting tools are in cutting engagement with the workpiece, means for detecting when the length of any of the cutting tools is improper comprising a plurality of sensing means individual to the cutting tools and disposed adjacent the paths of travel of the cutting tools in critical sensing relationship with the tips of the cutting tools at preselected positions of the head between said first and second positions during the travel of the cutting tools, a plurality of signalling means each including one of said sensing means effective when enabled to produce a first preselected indication if a portion of the associated cutting tool is in sensing relation with said one sensing means and to produce a different preselected indication if no portion of the associated cutting tool is in sensing relation with said one sensing means, and enabling means including means movable with the head for enabling each of said signalling means only when the head has moved to the corresponding one of preselected positions.

15. In a machine having a plurality of cutting tools of different lengths for performing a plurality of cutting operations at the same time upon a workpiece and a head supporting the cutting tools and movable from a first position in which the tips of the cutting tools are spaced from said workpiece to a second position in which the tips of the cutting tools are in cutting engagement with the workpiece, means for detecting when the length of any of the cutting tools is improper comprising a plurality of sensing means individual to the cutting tools and disposed adjacent the paths of travel of the cutting tools and in critical sensing relationship with the tips of the cutting tools at preselected positions of the head between said first and second positions during the travel of the cutting tools, a plurality of signalling means each including one of said sensing means effective when enabled to produce a first preselected indication if a portion of the associated cutting tool is in sensing relation with said one sensing means and to produce a different preselected indication if no portion of the associated cutting tool is in sensing relation with said one sensing means, and a plurality of enabling means each including means movable with the head for enabling each of said signalling means only when the head has moved to a corresponding one of said preselected positions.

16. The combination of claim 15 in which said sensing means is an inductance coil proximate the associated cutting tool and in which said signalling means includes an oscillatory circuit.

17. The combination of claim 15 in which said plurality of enabling means enable their associated signalling means at different points in the travel of said head.

18. The combination of claim 15 in which each of said enabling means includes an inductance coil and a ferrous rod one of which is fixed and the other of which is movable with the head.

19. The combination of claim 15 in which each of said enabling means includes a limit switch and an actuating member one of which is fixed and the other of which is movable with the head.

References Cited in the file of this patent

UNITED STATES PATENTS

| | | |
|---|---|---|
| 1,289,390 | Calleson | Dec. 31, 1918 |
| 2,641,697 | Schurr | June 9, 1953 |
| 2,807,720 | Charles | Sept. 24, 1957 |

OTHER REFERENCES

Clar, German application 1,033,991, printed July 10, 1958 (Kl 49a 55/01), 2 pages spec., 1 sheet drawing.

UNITED STATES PATENT OFFICE
CERTIFICATE OF CORRECTION

Patent No. 3,025,728                                            March 20, 1962

Ralph E. Cross et al.

It is hereby certified that error appears in the above numbered patent requiring correction and that the said Letters Patent should read as corrected below.

Column 8, line 18, for "coils" read -- coil --; column 10, line 27, for "CH2'" read -- CR2' --; column 13, line 75, for "which" read -- when --; column 16, line 65, for "of" read -- for --.

Signed and sealed this 24th day of July 1962.

(SEAL)

Attest:

ERNEST W. SWIDER
Attesting Officer

DAVID L. LADD
Commissioner of Patents